United States Patent [19]

Salvesen et al.

[11] 3,976,766

[45] *Aug. 24, 1976

[54] ARTIFICIAL ROUGHAGE MATERIALS

[75] Inventors: Robert H. Salvesen, Clark; Paul L. Malloy, Westfield, both of N.J.; Erle E. Bartley, Manhattan; RoNel M. Meyer, St. George, both of Kans.

[73] Assignee: Exxon Research and Engineering Company, Linden, N.J.

[ * ] Notice: The portion of the term of this patent subsequent to Apr. 8, 1992, has been disclaimed.

[22] Filed: July 29, 1974

[21] Appl. No.: 492,780

Related U.S. Application Data

[62] Division of Ser. No. 291,536, Sept. 25, 1972, Pat. No. 3,876,793, which is a division of Ser. No. 134,891, April 16, 1971, abandoned.

[52] U.S. Cl. ................................... 424/83; 424/78
[51] Int. Cl.². ................................... A61K 31/745
[58] Field of Search ..................... 424/78, 83

[56] References Cited
UNITED STATES PATENTS 3,415,225   12/1968   Collier ........................... 424/78 X

OTHER PUBLICATIONS

J. Animal Sci., 21, 277–283; 25, (1966), 64–68; 26, 849–854 (1967); 28, (1969), 84–89.

Primary Examiner—Frederick E. Waddell
Attorney, Agent, or Firm—Donald C. Caulfield; William T. Clarke; John J. Mahon

[57] ABSTRACT

Synthetic polymer compositions such as polymers and copolymers of ethylene and an alpha-olefin having a tensile strength at yield of less than about 1500 psi, a hardness of less than about 40 units on the Shore D hardness scale, and a tensile strength at 300% elongation of between about 450 to 1200 psi are effective artificial roughage materials when fed to ruminant animals. These synthetic polymer compositions, when ingested by the ruminant, form a loose fibrous mass in the rumen of the animal which enhances rumination. Increasing the rumination results in increasing the consumption of the feed by the animal and thus results in increased production of the animal products.

7 Claims, No Drawings

ARTIFICIAL ROUGHAGE MATERIALS

This is a division, of application Ser. No. 291,536 filed Sept. 25, 1972 now U.S. Pat. No. 3,876,793, which is a division of Ser. No. 134,891, filed Apr. 16, 1971, now abandoned.

FIELD OF THE INVENTION

This invention relates to feeding synthetic polymer compositions as an artificial roughage to ruminant animals. More particularly, this invention relates to feeding synthetic polymer compositions having critically defined characteristics to ruminants in order to form a loose, fibrous, hay-like mass in the rumen of the animal. The formation of a loose, fibrous network in the rumen of the animal increases rumination activity and thus maintains animal health during the feeding of high-energy (grain) diets to the animals.

The ruminant animal naturally feeds by ingesting relatively large amounts of feed into the rumen with a minimum of mastication before swallowing. One of the characteristics of ruminants is that such animals ruminate; that is, a portion of the contents of the rumen is returned, i.e., regurgitated into the mouth of the animal, for mastication. During mastication, the animal squeezes out the excess liquid and swallows it, then masticates the regurgitated ingesta into the form of a cud. The animal then swallows this remasticated food. Immediately upon swallowing, the act of regurgitation is repeated and new material is returned to the mouth for mastication. This rumination process, which consists essentially of regurgitation, mastication, and return of the masticated material to the rumen, is the natural process by which a ruminant makes a feed more readily digestible. Rumination, coupled with ruminal motility which is the mixing of the feed with fluids in the rumen of the animal, aids the animal in obtaining the nutrients contained in the feed.

Normally, ruminants are fed natural roughages such as alfalfa or straw hay as a portion of the feed component, along with other high energy feed components such as grain, concentrates, or the like. Roughage is generally considered essential in order to maintain animal health during the feeding of such high grain diets. One of the major characteristics of roughage is its ability to promote rumination. The physical characteristics of natural roughages vary; however, the essential characteristic of the roughage is that the ruminant must be able to regurgitate the roughage, form a cud, chew the cud, and reswallow the material. While the cud is in the mouth of the animal, the animal must be able to compress and form a bolus of the roughage material and other ingesta, and the bolus should remain compressed such that the ruminant will be able to reorient the cud in its mouth and compress the material continuously. However, when the cud is reintroduced into the rumen of the animal, the material which comprises the cud must be dispersed into particles that can again be regurgitated. As mentioned above, the presence of a sufficient amount of roughage as a feed component is important in order to induce and promote the rumination process, which process if maintained over a long period of time, allows the animal to consume greater quantities of normal feedstuffs. It is readily apparent that increasing the consumption of the feed results in increased production of animal products.

However, it has become increasingly difficult and expensive to provide the large volumes of roughage needed, especially in concentrated feedlots where there may be from several thousand to over one hundred thousand cattle in a relatively small area. In addition, the large amount of roughage also produces a large volume of fecal material which results in pollution and disposal problems. Thus, there are adequate incentives to reduce or eliminate the use of natural roughages and to substitute an artific

DESCRIPTION OF THE PRIOR ART

Various materials have been fed to ruminant animals in order to eliminate the necessity of feeding natural roughage to ruminants. Cracked oyster shell, fed in carefully-controlled quantities, is one of the artificial roughage materials which have heretofore been employed. However, there are attendant difficulties with this procedure in that the oyster shell significantly reduces rumination as well as the fact that the oyster shell, which possesses relatively sharp edges and splinters, may damage the animal's alimentary canal.

Materials such as sawdust, sawdust pellets, newspaper, and other natural and artificial products have been fed to ruminants as a roughage. Plastic materials in the form of polyethylene powder (see J. Animal Sci., 25, 64–68 (1966), P. T. Chandler et al.), small pellets (see J. Animal Sci., 21, 277–83 (1962), R. R. Oltjen et al.), short fibers (see J. Animal Sci., 28, 84–89 (1969), J. A. Boling et al.), as well as polypropylene in several different shapes and sizes (see J. Animal Sci., 26, 849–54 (1967), J. G. Welch), have also been fed as artificial roughage with varying degrees of success. These reports indicate some increases in rumination time due to the use of plastic in the diet.

It has recently been proposed that inert bodies or pellets of plastic having sufficiently-roughened outer surface edges to physiologically trigger secretions of saliva by the animal through physical contact of such roughened surfaces with the wall of the animal's rumen when orally administered to the animals may be employed as an artificial roughage material (see U.S. Pat. No. 3,415,225). This artificial roughage material is retained in the stomach of the animal, and as a result of the sufficiently-roughened outer edges, results in production of saliva flowing to the rumen. In addition to the effect of accomplishing the stimulation of saliva by physical massage of the rumen walls, the size of the material administered to the ruminants must be selected to minimize mastication of the pellets by the animal in order that the plastic pellet retain a shape capable of effecting necessary massage to the stomach wall. However, while the administering of these plastic pellets has the effect of maintaining or even increasing ruminal motility which is necessary to the health and proper utilization of ingested nutrients, the plastic material does not promote and in fact results in no appreciable tendencies for the animals to ruminate.

SUMMARY OF THE INVENTION

It has now been discovered that critically-defined synthetic polymer compositions, as hereinafter described, when fed to ruminant animals promote the rumination process in that said artificial roughage compositions are regurgitated and chewed by the animal and thereafter formed into a loose, fibrous, hay-like mass in the rumen of the animal. The loose, fibrous, hay-like mass formed by the feeding of the synthetic polymer compositions provides beneficial functions similar to those provided when the animal is fed natural roughage material.

As mentioned above, one of the major characteristics of roughage is its ability to induce rumination. The roughage material, when initially ingested into the rumen, must be dispersed into particles that can be regurgitated. Upon regurgitation, the roughage must then be able to be compressed and form a bolus, i.e., cud of material in the mouth of the animal. In addition, upon continuous mastication of the cud in the mouth of the animal, the material must remain compressed and not disintegrate into a loose particulate mass.

Now, in accordance with the instant invention, when ruminant animals are fed synthetic polymer compositions having a tensile strength at yield of less than about 1500 psi and a tensile strength at 300% elongation of between 450 and 1200 psi and a hardness of less than about 40 units on the Shore D hardness scale, said compositions are transformed into a thick, loose, fibrous, hay-like network or mass in the rumen of the animal. This hay-like mass can be broken apart by the normal movement of the rumen and the rumen fluid while at the same time it is capable of being regurgitated, rechewed and reswallowed along with some of the other ingesta. In addition, the ingestion of synthetic polymer compositions having the above-described critically-defined characteristics results in promoting rumination in the animals such that the animals consume greater quantities of normal feedstuffs when the synthetic polymer compositions of the instant invention are included in the feed fed to the animals.

Preferably, the artificial roughage materials of the instant invention are those inert synthetic polymer compositions which exhibit the properties as specified in Table I.

TABLE I

| Properties for Polymeric Artificial Roughage Material | | | |
|---|---|---|---|
| | Maximum | Minimum | Preferred Range |
| Hardness, Shore D Scale | 40 | 20 | 30–35 |
| Tensile Strength at Yield (Yield Strength) psi | 1500 | 400 | 550–950 |
| Tensile Strength at 300% Elongation (300% Modulus) psi | 1200 | 450 | 700–800 |

By tensile strength at yield is meant the tensile stress at the yield point wherein the yield point is the first point on the stress strain curve at which an increase in strain occurs without an increase in stress, as defined in ASTM D 638–64T. This is to be contrasted with tensile strength at break, by which is meant the tensile stress at the moment of rupture of the test specimen, as defined in ASTM D 638–64T. Most preferably, the polymer compositions of the instant invention, i.e., those polymer compositions exhibiting the physical properties as specified in Table I which act as superior artificial roughage materials in accordance with the instant invention, have a tensile strength at break in the range of from about 2000 to about 3200 pounds per square inch.

While it is to be understood that any inert polymer composition having a tensile strength at the yield point of less than about 1500 psi, a 300% modulus of between 450 and 1200 psi and hardness of less than about 40 units on the Shore D hardness scale will function as an artificial roughage and be beneficial to the ruminant in the above-described manner, the preferred synthetic polymer compositions amenable to the instant invention can be generally classified as an elastomeric polymer, a plastomeric polymer or a blend of a plastic-elastomeric polymer wherein the polymer, copolymer, or blends thereof conform to the specification as described in Table I. Representative, nonlimiting examples of elastomeric polymers which can be employed in the practice of this invention include: styrene butadiene elastomers, ethylene vinylacetate polybutadiene elastomers, ethylene-propylene copolymers, ethylene-propylene terpolymers wherein the third monomer may be 1,5-hexadiene, dicyclopentadiene, 5-ethylidene norbornene, isobutylene-isoprene copolymer, polyisoprene, polychloroprene and the like. The most preferred elastomeric polymer compositions of the instant invention comprise a copolymer of ethylene and an alpha-olefin and most specifically an ethylene-propylene copolymer wherein the content of ethylene is in the range from about 80 to about 90 weight % and wherein the content of propylene is in the range of 10 to about 20 weight %.

Plastomeric polymers, by which is meant a polymer which is made of the same monomers as an elastomeric polymer but due to polymerization conditions exhibits a plastic quality to the elastomer, which can be employed in the practice of the instant invention include: ethylene-propylene copolymers wherein the ethylene content is in the range of from about 80 to about 90 weight %.

While it can be generally stated that plastic materials alone, such as polyethylene, polypropylene, polystyrenes and the like, exhibit a hardness which renders such materials outside the scope of the instant invention, blends of plastic-elastomeric polymers which exhibit the specifications as defined in Table I are particularly preferred artificial roughage materials. Typical, nonlimiting examples of such plastic-elastomeric blends include: polyethylene-elastomer blends wherein the elastomer consists of ethylene-propylene copolymers, ethylene-propylene-terpolymers and the like. The most preferred plastic-elastomeric polymer blends, in accordance with the instant invention, comprise from about 25 to about 75 weight % low density polyethylene in combination with from about 75 to about 25 weight % of an ethylene-propylene copolymer or an ethylene-propylene-5-ethylidene norbornene terpolymer and mixtures comprising equal weight percentages of said ethylene-propylene copolymer and ethylene-propylene-5-ethylidene norbornene.

It will be obvious to one skilled in the art of polymer formulation that materials useful for this invention can be made from mixtures of a polymer with other components such as plasticizers, fillers, and other polymers, or could be altered by vulcanization or physical working, etc. Thus a polymer which does not inherently meet the specifications of the instant invention could be formulated with other materials to produce a material which does conform to the required specifications.

While not wishing to be bound by any particular theory, it is believed that synthetic polymer compositions having the above-described critical characteristics, i.e., tensile strength and Shore hardness, result in unexpectedly superior artificial roughages in that said compositions, while in the rumen, form a loose, fibrous hay-like mass, which floats in the rumen while at the same time forms a bolus of material which can be compressed when masticated in the mouth of the animal and thereby aids digestion in the rumen by promoting salivation of the animal.

If synthetic polymer compositions having a tensile strength at yield and at 300% elongation below about 500 psi, i.e., low density polyethylenes, are employed as an artificial roughage material, the roughage material is chewed into smaller and smaller pieces and eventually eliminated from the animal. The latter type of material is not capable of forming a bolus and does not function like natural roughage. Polymer compositions with a tensile strength above about 1500 psi, i.e., crystalline polypropylene, result in a roughage which is too difficult to be chewed by the ruminant and will not allow the formation of a hay-like mass in the rumen of the animal. Such compositions may also be expected to cause irritations of the intestinal tract. Polymer compositions which have a hardness above about 40 on the Shore D scale will tend to irritate the lining of the intestinal tract. The synthetic polymer compositions within the limits of tensile strength and hardness as described in Table I are critical in order that the artificial roughage material can be chewed and transformed into thin, fibrous strands which are soft and pliable, and which will eventually form a loose, interwoven mass in the rumen.

Thus, it can be seen that the synthetic polymer compositions of the instant invention offer significant advances over that presently available in the art in that said compositions maintain ruminal movements, stimulate the more worthwhile rumination activities, which reduces the adverse effects such as bloat during the feeding of high-energy rations to the animals.

The physical shape of the polymer which may be fed to the ruminant animal is not critical for formation of the fibrous, hay-like mass and may consist of rods, tubes, spheres, thin flakes, cubes or other convenient shapes. The particles may have smooth or rough surfaces. Particle size is of some concern and should be small enough to be readily accepted by the animal. With beef and dairy cattle weighing over 500 pounds, particles of about 1 inch in length, about ½ inch in width and about ½ inch in thickness (0.25 cubic inches or about 4 cc. in volume) are acceptable. Particles longer than 1 inch with the above thickness and width tend to be less readily consumed. However, if the larger particles are ingested by the animal, they are masticated and found to be effective. Thus, there is a practical limit to the size which should be fed. Small particles of less than ¼ inch in length and ⅛ inch in width and 1/16 inch (0.002 cubic inch or about 0.032 cc. in volume) were found to be effective, but tend to pass from the rumen more rapidly compared to the larger particles and thus would be less desirable.

For example, an artificial roughage material consisting of an ethylene propylene copolymer, i.e., 83 to 90% ethylene and 10 to 17% propylene having a tensile strength at yield of 650 psi, a tensile strength at 300% elongation of 725 and a hardness of 30 on the Shore D hardness scale, was fed to fistulated cattle in the shapes and sizes indicated in Table II, and examination of the rumen contents indicated the following:

TABLE II

| Shape | Size and Shape of Particles Fed | | | Formed Loose Interwoven Mass | Rate of Passage Through Rumen |
| --- | --- | --- | --- | --- | --- |
| | Length | Width | Thickness | | |
| Oval | 1/2" | 1/2" | 1/4" | Yes | Slow |
| Rod | 1/2" | — | 1/4" | Yes | Slow |
| Random | 3/16–1/2" | 1/16–1/4" | 1/8" | Yes | Rapid |
| Shredded | 1/2–1" | 3/8–5/8" | 1/4–1/2" | Yes | Slow |
| Flat | 1/2–3/4" | 1/2" | 1/16–1/8" | Yes | Slow |

Ruminant animals can subsist on natural roughage alone, but ruminant animals fed for commercial production of meat or milk are usually fed rations containing about 5 to 50 weight % natural roughage material. The remainder of the ration provides the nutrients and energy required to provide commercial levels of production. The non-roughage portion, called the high energy portion or "concentrate," is composed of cereal grains (corn, soybean, etc.), oilseed meals (e.g., soybean meal), or other protein sources, urea, vitamins, minerals and other supplements. In accordance with the instant invention, the ruminant animal feed composition may contain from about 95 to about 99.99 weight % concentrate having admixed therewith about 0.01 to about 5.0 weight % of the synthetic polymer compositions of the instant invention, and more preferably from about 0.05 to about 2.0 weight %. In view of the fact that the artificial roughage materials of the instant invention promote rumination, the amount of said materials as synthetic polymer compositions which may be added to the feed may vary over a wide range in order to achieve the desired result. For example, larger quantities of the synthetic polymer compositions of the instant invention may be fed to animals consuming large quantities of high-energy, readily digested rations (high grain rations). Lesser quantities may be desirable when fed to animals consuming relatively low-energy, less readily digestible rations, as, for example, rations which contain some natural roughage components. Accordingly, it is to be understood that it is clearly within the scope of this invention to feed the artificial roughage materials of the instant invention in conjunction with natural roughage material to aid in the digestion processes of the ruminant animal. It can be seen that the promotion of the rumination activity of the animal is essential in order to achieve either or both of these end results.

Having now described this invention, further illustrations are shown in the following examples. However, no limitations are to be implied from these examples over and above those contained in the claims appended hereto, since variations and modifications will be obvious to those skilled in the art.

EXAMPLE 1

Table III shows the effect of employing a variety of synthetic polymer compositions having a density of between 0.70 and 0.99. The performance of these compositions in the rumen in Runs 8–17 were observed one to two hours after the feeding through a "window" in a fistulated animal. The synthetic polymer compositions are listed in Table III in order of decreasing hardness, starting with those materials which by virtue of their hardness are measured by the Rockwell Test (ASTM-D-785-65) and followed by less rigid materials whose hardness is evaluated by the Shore D Hardness Test (ASTMD-1706-61).

TABLE III

Properties of Various Polymeric Materials and Comments on their Ability to be Regurgitated and Formed into a Mass in the Rumen

| Run No. | Polymer Material Type | Composition | Hardness Rating | Hardness Scale | Tensile Strength at Break, psi | Yield Strength psi | 300% Modulus psi |
|---|---|---|---|---|---|---|---|
| 1 | Polyesters | | 94–120 | Rockwell M | 8,000–20,000 | 2,000–10,000 | 8,000–20,000 |
| 2 | Acrylic Resins | 100% Methylmethacrylate | 80–105 | " | 7,000–11,000 | 6,000–10,000 | — |
| 3 | Nylons | 100% Polyamide | M31–R120 | " | 5,120–14,000 | 5,000–12,000 | 5,000–12,000 |
| 4 | Polystyrenes | 100% Polystyrene | M65–R100 | " | 1,500–12,000 | 1,500–10,000 | — |
| 5 | Polypropylene | 100% Polypropylene | 70 | Shore D | 4,900 | 3,000–4,500 | — |
| 6 | High Density Polyethylene | 100% Polyethylene | 60–70 | " | 3,100–5,500 | 2,000–5,500 | — |
| 7 | Melamine Formaldehyde Resins | 100% Melamine Formaldehyde Resin | 50–65 | " | 3,500–5,500 | 1,500 | 3,000–5,000 |
| 8 | Polyethylene | 100% Low Density Polyethylene | 48 | " | 1,600 | 1,600 | 1,350 |
| 9 | Polyethylene-Elastomer Blend | 57% Low Density Polyethylene 43% Copolymer (containing 72–76% Ethylene, 14–18% Propylene and 3–3.4% 5-Ethylidene Norbornene) | 35 | " | 1,500 | 950 | 910 |
| 10 | Ethylene Vinylacetate Copolymer | 81–83% Ethylene; 17–19% Vinylacetate | 35 | " | 2,750 | 650 | 800 |
| 11 | Polyethylene-Elastomer Blend | 33% Low Density Polyethylene 33% Copolymer (containing 72–76% Ethylene, 14–18% Propylene, 3–3.4% 5-Ethylidene Norbornene) 33% Copolymer (containing 83–90% Ethylene, 10–17% Propylene) | 33 | " | 2,030 | 700 | 780 |

| Run No. | Polymer Material Type | Composition | Polymer Regurgitated | Polymer forms Hay-like Mass in Rumen | Remarks |
|---|---|---|---|---|---|
| 1 | Polyesters | | | | Due to the hardness of the composition, while the material would be regurgitated, a hay-like mass would not be expected to be formed in the rumen. |
| 2 | Acrylic Resins | 100% Methylmethacrylate | | | |
| 3 | Nylons | 100% Polyamide | | | |
| 4 | Polystyrenes | 100% Polystyrene | | | |
| 5 | Polypropylene | 100% Polypropylene | | | |
| 6 | High Density Polyethylene | 100% Polyethylene | | | |
| 7 | Melamine Formaldehyde Resins | 100% Melamine Formaldehyde Resin | | | |
| 8 | Polyethylene | 100% Low Density Polyethylene | Yes | No | Composition was broken down into small pieces by mastication. No interwoven mass formed. |
| 9 | Polyethylene-Elastomer Blend | 57% Low Density Polyethylene 43% Copolymer (containing 72–76% Ethylene, 14–18% Propylene and 3–3.4% 5-Ethylidene Norbornene) | Yes | Yes | Particles elongated by mastication and tended to form a small mass. |
| 10 | Ethylene Vinylacetate Copolymer | 81–83% Ethylene; 17–19% Vinylacetate | Yes | Yes | Elongated fiber-like particles formed by mastication which form a large, loosely bound interwoven mass bound interwoven mass in the rumen. |
| 11 | Polyethylene-Elastomer Blend | 33% Low Density Polyethylene 33% Copolymer (containing 72–76% Ethylene, 14–18% Propylene, 3–3.4% 5-Ethylidene Norbornene) 33% Copolymer (containing 83–90% Ethylene, 10–17% Propylene) | Yes | Yes | |

| Run No. | Polymer Material Type | Composition | Hardness Rating | Hardness Scale | Tensile Strength at Break, psi | Yield Strength psi | 300% Modulus psi |
|---|---|---|---|---|---|---|---|
| 12 | Polyethylene- | 62% Low Density Polyethylene | 32 | Shore D | 1,650 | 770 | 700 |

TABLE III-continued

Properties of Various Polymeric Materials and Comments on their Ability to be Regurgitated and Formed into a Mass in the Rumen

| | | | | | | | |
|---|---|---|---|---|---|---|---|
| | Elastomer Blend | 33% Copolymer (containing 40–46% Ethylene, 54–60% Propylene) | | | | | |
| 13 | Ethylene-Propylene Copolymer | 83–90% Ethylene, 10–17% Propylene | 30 | '' | 3,150 | 650 | 725 |
| 14 | Polyethylene-Elastomer Blend | 50% Low Density Polyethylene 50% Copolymer (containing 72–76% Ethylene, 14–18% Propylene, 3–3.4% 5-Ethylidene Norbornene) | 30 | '' | 1,500 | 680 | 720 |
| 15 | Polyethylene-Elastomer Blend | 43% Low Density Polyethylene 57% Copolymer (containing 72–76% Ethylene, 14–18% Propylene, 3–3.4% 5-Ethylidene Norbornene) | 30 | '' | 1,450 | 550 | 620 |
| 16 | Polyethylene-Elastomer Blend | 25% Low Density Polyethylene 75% Copolymer (containing 72–76% Ethylene, 14–18% Propylene, 3–3.4% 5-Ethylidene Norbornene) | 30 | '' | 1,400 | 400 | 450 |
| 17 | Ethylene Propylene Copolymer | 72–76% Ethylene, 14–18% Propylene, 3–3.4% 5-Ethylidene Norbornene | 29 | '' | 1,350 | 220 | 280 |

| Run No. | Polymer Material Type | Polymer Material Composition | Performance in Ruminant | | |
|---|---|---|---|---|---|
| | | | Polymer Regurgitation | Polymer forms Hay-like Mass in Rumen | Remarks |
| 12 | Polyethylene-Elastomer Blend | 62% Low Density Polyethylene 33% Copolymer (containing 40–46% Ethylene, 54–60% Propylene) | Yes | yes | Particles elongated by mastication and tend to form a small mass. |
| 13 | Ethylene-Propylene Copolymer | 83–90% Ethylene, 10–17% Propylene | Yes | Yes | Elongated fiber-like particles formed by mastication which form a large loosely bound interwoven mass in the rumen. |
| 14 | Polyethylene-Elastomer Blend | 50% Low Density Polyethylene 50% Copolymer (containing 72–76% Ethylene, 14–18% Propylene, 3–3.4% 5-Ethylidene Norbornene) | Yes | yes | Particles elongated by mastication and tend to form a small mass. |
| 15 | Polyethylene-Elastomer Blend | 43% Low Density Polyethylene 57% Copolymer (containing 72–76% Ethylene, 14–18% Propylene, 3–3.4% 5-Ethylidene Norbornene) | Yes | Yes | Particles elongated by mastication and tend to form a small mass. |
| 16 | Polyethylene-Elastomer Blend | 25% Low Density Polyethylene 75% Copolymer (containing 72–76% Ethylene, 14–18% Propylene, 3–3.4% 5-Ethylidene Norbornene) | Yes | Yes | Particles elongated by mastication and tend to form a small mass. |
| 17 | Ethylene Propylene Copolymer | 72–76% Ethylene, 14–18% Propylene, 3–3.4% 5-Ethylidene Norbornene | Yes | No | Particles were broken down into small pieces by mastication. no mass formed. |

This table shows that synthetic polymer compositions possessing the critically defined specifications, i.e., Run Nos. 9–16, are effective artificial roughage materials in that said compositions are capable of being regurgitated while at the same time forming a hay-like mass in the rumen of the animal. As can be seen from Table III, those compositions which form the preferred, large, loosely woven hay-like mass in the rumen of the animal, i.e., Run Nos. 10, 11 and 13, had a tensile strength at break between about 2000 and 3200 psi.

EXAMPLE 2

This example shows the increase in feed consumption resulting from the use of the artificial roughage material of the instant invention.

Two groups of ten animals each were fed a ration consisting of 15% ground corn, 78% ground sorghum grain, 5% soybean meal, 0.5% urea, 1.0% dicalcium phosphate, 0.5% trace mineralized salt and 2000 IU per pound of vitamin A. This ration was fed twice daily and all animals were permitted to eat all the grain they would consume. Water was available to the animals at all times. One group of animals was fed the above ration and the other group the same ration plus 0.75 weight % of an artificial roughage material of the instant invention; namely, an ethylene-propylene copolymer containing 83–90% ethylene and 10–17% propylene, per 100 pounds of ration. The test was run for a period of four months in a finishing program and the animals were fed both rations up until the time of slaughter. The average daily intake for each month and the total feeding period are listed below in Table IV.

TABLE IV

| | Average Daily Feed Intake, Pounds/Head | | |
|---|---|---|---|
| Test Period | Control Animals | Animals Fed Artificial Roughage | Difference |
| 1st month | 24.4 | 25.6 | 1.1 |
| 2nd month | 25.5 | 26.5 | 1.0 |
| 3rd month | 24.5 | 27.2 | 2.7 |
| 4th month | 23.9 | 25.8 | 1.9 |
| Total Feed Intake During Entire Test Period of 126 Days, Pounds/Head | 3094 | 3303 | 209 |

In addition to a substantial increase in feed consumption by the ruminants fed the artificial roughage material of the instant invention, examination of the digestive tract of both groups of animals indicated severe deterioration of the rumen papillae of the control animals, but little or no deterioration of the papillae in the animals receiving the artificial roughage material. Accordingly, this shows that the artificial roughage material was acting as a natural roughage material by maintaining the papillae in a healthy condition. Other parts of the digestive tract such as the abomasum and small intestines on the control animals had damage ranging from slight to severe, whereas the animals fed the artificial roughage had little or no injuries to these organs. The damage to the small intestines of the control animals was a reddening of the intestinal wall, attributed to acidosis which is prevalent with animals fed a low-roughage diet.

What is claimed is:

1. A method for aiding digestion in a ruminant animal which comprises feeding to said ruminant animal in conjunction with an animal feed an effective rumination promoting amount of an inert, elastomeric, plastomeric, or plastic elastomeric polymer selected from the group consisting of an elastomeric or plastomeric copolymer of ethylene and an alpha olefin, a copolymer of ethylene and vinyl acetate and a blend of a plastic polyethylene with an elastomeric ethylene propylene copolymer said polymer having a tensile strength at yield of between about 400 to about 1500 pounds per square inch, a hardness of less than 40 on the Shore D hardness scale and a tensile strength at 300% elongation of between about 450 to about 1200 pounds per square inch.

2. The method according to claim 1 wherein a blend is employed as the polymer, said blend being formed of an elastomeric polymer and a plastic polymer wherein an ethylene/propylene copolymer is the elastomeric polymer and polyethylene is the plastic polymer.

3. The method of claim 1 wherein the elastomeric polymer is an ethylene-propylene-ethylidene norbornene terpolymer.

4. The method of claim 2 wherein the elastomeric polymer is an ethylene-propylene-5-ethylidene norbornene terpolymer.

5. The method of claim 2 wherein the elastomeric polymer is a blend of an ethylene-propylene copolymer and an ethylene-propylene-5-ethylidene norbornene terpolymer.

6. A ruminant animal feed composition comprising from about 95 to about 99.99 weight % of a concentrate admixed with from about 0.01 to about 5.0 weight % of an inert plastomeric polymer, an elastomeric polymer, or a blend of a plastic polymer and an elastomeric polymer having a tensile strength at yield at a pressure in the range of from about 400 to about 1500 psi, a hardness of less than 40 on the Shore D hardness scale, a tensile strength at 300% elongation at a pressure in the range of from about 450 to about 1200 pounds per square inch.

7. The composition of claim 6 wherein the amount of concentrate is in the range of from about 98 to about 99.95 weight % and wherein the amount of inert plastomeric polymer, elastomeric polymer, or blend of a plastomeric polymer and an elastomeric polymer is in the range of from about 0.05 to about 2.0 weight %.

* * * * *